(12) United States Patent
Nyudou

(10) Patent No.: US 6,496,507 B1
(45) Date of Patent: Dec. 17, 2002

(54) DEVICE AND METHOD FOR SYSTEM SWITCHING CONTROL

(75) Inventor: Katsuyoshi Nyudou, Tokyo (JP)

(73) Assignee: NEC Corporation, Tokyo (JP)

( * ) Notice: Subject to any disclaimer, the term of this patent is extended or adjusted under 35 U.S.C. 154(b) by 371 days.

(21) Appl. No.: 09/589,073

(22) Filed: Jun. 8, 2000

(30) Foreign Application Priority Data

Jun. 9, 1999 (JP) ............................................ 11-163113

(51) Int. Cl.[7] ............................................... H04L 12/28
(52) U.S. Cl. ...................................... 370/395; 370/220
(58) Field of Search ................................ 370/218, 219, 370/220, 235, 371, 374, 386, 378, 395, 395.1, 395.7, 395.71

(56) References Cited

U.S. PATENT DOCUMENTS

| | | | | |
|---|---|---|---|---|
| 5,896,381 A | * | 4/1999 | Imai | 370/395 |
| 6,031,838 A | * | 2/2000 | Okabe et al. | 370/395 |

FOREIGN PATENT DOCUMENTS

| | | |
|---|---|---|
| JP | 2-246646 | 10/1990 |
| JP | 5-7213 | 1/1993 |
| JP | 5-83271 | 4/1993 |
| JP | 5-344144 | 12/1993 |
| JP | 6-197121 | 7/1994 |
| JP | 6-216928 | 8/1994 |
| JP | 8-204688 | 8/1996 |
| JP | 9-74413 | 3/1997 |
| JP | 11-341006 | 12/1999 |
| JP | 1 047 227 | * 4/2000 |

* cited by examiner

*Primary Examiner*—Wellington Chin
*Assistant Examiner*—Brenda Pham
(74) *Attorney, Agent, or Firm*—Sughrue Mion, PLLC

(57) ABSTRACT

A system switching control device includes a switching section, two cell storage sections, a system control section, a circuit cell storage section and a cell circuit section. The switching section executes system switching operation for changing its connection between the two cell storage sections, in which cells inputted to the switching section is selectively supplied to one of the cell storage sections (operating system cell storage section), and are not supplied to the other (standby system cell storage section). The timer section counts a time concerning a system switching time U(s) after the system switching. The system control section reads out cells from the standby system cell storage section during the system switching time U(s) just after the system switching so as to clear the cells therefrom, and reads out cells from the operating system cell storage section during a period after the system switching time U(s). The cells read out from the cell storage sections are temporarily stored in the circuit cell storage section having enough storage capacity, and thereafter packed by the cell circuit section in appropriate frames and transmitted. All the cells which accumulated in the operating system cell storage section during the system switching time U(s) are moved into the circuit cell storage section during the period after the system switching time U(s), thereby cell overflow and cell loss at the cell storage sections are avoided.

14 Claims, 8 Drawing Sheets

DEVICE AND METHOD FOR SYSTEM SWITCHING CONTROL

BACKGROUND OF THE INVENTION

The present invention relates to a system switching control device and a system switching control method for executing system switching operation between two systems (operating system and standby system), in which one cell storage device is selected as an operating system cell storage device from two cell storage devices of the two systems and cells are selectively supplied to the operating system cell storage device.

DESCRIPTION OF THE PRIOR ART

A system switching control device is used in an apparatus having two systems to be alternately employed as an "operating system" and a "standby system". FIG. 1 is a schematic block diagram showing an example of a conventional system switching control device. The conventional system switching control device of FIG. 1 is composed of a switch section 101 and a cell circuit section 108 which is connected to the switch section 101. The switch section 101 includes a switching section 103, two cell storage sections 104, a system control section 105 and a timer section 106.

The switching section 103 selectively supplies inputted cells to one of the cell storage sections 104. The cell storage section 104 that receives the cells from the switching section 103 is regarded as an operating system cell storage section 104, and the other cell storage section 104 that does not receive the cells from the switching section 103 is regarded as a standby system cell storage section 104. In short, the switching section 103 executes system switching operation between two systems (operating system and standby system). The cell storage section 104 temporarily stores the cells supplied from the switching section 103 in its buffer. The buffer operates as a FIFO (First-In First-Out) memory having enough capacity, in which the received cells are stored in order of reception and the stored cells are read out in order of the storage. The system control section 105 executes cell read control to the operating/standby system cell storage sections 104 when the system switching operation is conducted.

The cell circuit section 108 packs the cells supplied from the cell storage section 104 in appropriate frames and transmits the frames. The timer section 106 is a timer to which a system switching protection time T(s) is set. In the system switching operation, the timer section 106 starts counting when a count start instruction is supplied from the system control section 105. When the count reached the system switching protection time T(s), the timer section 106 informs the system control section 105 of the elapse of the system switching protection time T(s) and resets the count to "0".

FIG. 2 is a schematic block diagram showing an example of the composition of the cell storage section 104 of the conventional system switching control device of FIG. 1. The cell storage section 104 shown in FIG. 2 includes a cell reception section 109, a cell write section 110, a buffer 111 and a cell output section 112.

When the cell reception section 109 received a cell from the switching section 103, the cell reception section 109 sends a first cell reception signal (indicating that a cell to be written in the buffer 111 has been reached) to the cell write section 110. The cell write section 110 which received the first cell reception signal from the cell reception section 109 executes cell write control to the buffer 111. The buffer 111 is a FIFO memory which stores cells in order of reception and outputs the cells in order of the storage. The system control section 105 executes cell read control to the buffer 111. The cell output section 112 receives the cells read out from the buffer 111 and sends the cells to the cell circuit section 108 in order of reception.

FIG. 3 is a schematic block diagram showing an example of the composition of the cell circuit section 108 of the conventional system switching control device of FIG. 1. The cell circuit section 108 shown in FIG. 3 includes a circuit cell reception section 113, a circuit cell write/read section 114, a circuit buffer 115 and a circuit section 116.

When the circuit cell reception section 113 received a cell from the cell storage section 104, the circuit cell reception section 113 sends a second cell reception signal (indicating that a cell to be written in the circuit buffer 115 has been reached) to the circuit cell write/read section 114. The circuit buffer 115 is a small-size FIFO (First-In First-Out) memory which is provided to the cell circuit section 108 in order to absorb a delay of cells due to cell-packing operation by the circuit section 116. The circuit cell write/read section 114 which received the second cell reception signal from the circuit cell reception section 113 executes cell write control of the circuit buffer 115, in which the received cells are written in the circuit buffer 115 in order of reception. The circuit cell write/read section 114 also executes cell read control of the circuit buffer 115, in which the cells stored in the circuit buffer 115 are read out in order of the writing.

The circuit buffer 115 has a threshold cell storage capacity. When the amount of the cells stored in the circuit buffer 115 reached the threshold cell storage capacity, the cell circuit section 108 sends a cell threshold signal to the system control section 105. The system control section 105 which received the cell threshold signal suspends the cell reading from the operating system cell storage section 104, thereby loss of cells at the circuit buffer 115 can be avoided. The circuit section 116 receives the cells read out from the circuit buffer 115, packs the cells in appropriate frames, and transmits the frames.

In the following, the operation of the conventional system switching control device of FIGS. 1 through 3 will be described more in detail. The inputted cells flow through the switching section 103, the operating system cell storage section 104 and the cell circuit section 108. In the ordinary cell transfer state, the system switching operation for switching between the operating system and the standby system is executed. In the system switching operation, the switching section 103 stops the supply of cells to the present standby system cell storage section 104 (former operating system cell storage section 104) and starts the supply of cells to the present operating system cell storage section 104 (former standby system cell storage section 104).

When the system switching occurred, the system control section 105 suspends the cell reading from the present operating system cell storage section 104 for a system switching time U(s). Therefore, in the present operating system cell storage section 104, cell writing to the buffer 111 is executed ordinarily but cell reading from the buffer 111 is suspended during the system switching time U(s).

In the system switching operation, the system control section 105 operates as follows. The system control section 105 confirms that no cell remains in the former operating system cell storage section 104 (present standby system cell storage section 104). If one or more cells remained in the former operating system cell storage section 104, the system control section 105 continues monitoring the former operating system cell storage section 104 until it confirms that all the cells have been outputted and no cell remains. If we assume it takes a confirmation time S(s) for the confirmation of the vacancy of the former operating system cell storage section 104 since the start of the system switching, the cell reading from the present operating system cell storage section 104 keeps on being suspended during the confirmation time S(s). After the vacancy of the former operating system cell storage section 104 could be confirmed, the system control section 105 further suspends the cell reading from the present operating system cell storage section 104 for the system switching protection time T(s) which is set to the timer section 106. The system switching protection time T(s) guarantees the "no passing" for a cell that has been supplied from the switching section 103 to the former operating system simultaneously with the system switching and which has not reached the former operating system cell storage section 104. The system control section 105 does not make the judgment of the vacancy (no remaining cells) of the whole former operating system only by the vacancy of the former operating system cell storage section 104, but further waits for the system switching protection time T(s), thereby cells existing in the former operating system other than the former operating system cell storage section 104 are prevented from being lost.

The system switching protection time T(s) is set long enough so that any cell remaining in the former operating system can pass the former operating system. After the system switching protection time T(s) (after the confirmation time S(s) after the system switching) has elapsed, the system control section 105 starts the cell reading from the present operating system cell storage section 104. If cells remaining in the former operating system existed at this stage, the cells are lost. The system switching time U(s) can be expressed as:

$$U(s)=S(s)+T(s).$$

Consequently, cells which are written in the present operating system cell storage section 104 during the system switching time U(s) are accumulated in the present operating system cell storage section 104.

However, in the conventional system switching control device, the number of cells accumulated in the present operating system cell storage section 104 increases as the system switching is repeated, thereby overflow occurs in the cell storage section 104, and as a result, cell loss occurs.

In the following, a process to the cell loss will be explained referring to FIGS. 4A through 4E. FIGS. 4A through 4E are schematic diagrams showing the change of states of the conventional system switching control device of FIG. 1 when the system switching is repeated.

FIG. 4A shows an ordinary cell transfer state before a system switching is executed, in which cells flow through the operating system cell storage section 104 and the cell circuit section 108.

FIG. 4B shows a state just after a system switching, in which the system control section 105 suspends the cell reading from the present operating system cell storage section 104 during the system switching time U(s) while executing cell reading from the present standby system cell storage section 104. Consequently, cells keeps on being supplied to the operating system cell storage section 104 and accumulates in the buffer 111 of the operating system cell storage section 104 during the system switching time U(s). The number of cells which accumulates in the buffer 111 of the operating system cell storage section 104 during the system switching time U(s) will hereafter be assumed to be M (cells).

FIG. 4C shows a state when the system switching has been completed, in which the cells accumulated in the operating system cell storage section 104 moves to the cell circuit section 108 and accumulates in the cell circuit section 108, since the cell input speed to the circuit section 116 of the cell circuit section 108 is slower than the cell read speed from the cell storage section 104. The circuit section 116 takes long time for dividing the cells into information cells and control cells and packing the cells in frames, therefore, the cell input speed to the circuit section 116 becomes slow and the cells are accumulated in the cell circuit section 108.

In FIG. 4C, if all the cells accumulated in the cell storage section 104 moves into the cell circuit section 108, overflow occurs in the circuit buffer 115 of the cell circuit section 108 and thereby cell loss occurs. The threshold cell storage capacity is set to the circuit buffer 115 in order to avoid the cell loss. When the amount of the cells stored in the circuit buffer 115 reached the threshold cell storage capacity, the cell circuit section 108 sends the cell threshold signal to the system control section 105. When the system control section 105 received the cell threshold signal, the system control section 105 suspends the cell reading from the operating system cell storage section 104 and thereby the cell loss at the circuit buffer 115 is avoided. Consequently, some cells remain accumulated in the cell storage section 104. The number of the cells remaining in the cell storage section 104 will hereafter be assumed to be N (cells).

FIG. 4D shows a state just after a second system switching. Referring to FIG. 4D, the number of cells accumulated in the operating system cell storage section 104 becomes M+N, in which M is the number of cells accumulated in the present operating system cell storage section 104 during the system switching time U(s) and N is the number of cells which remained in the present operating system cell storage section 104 during the period when it was operating as the standby system cell storage section 104.

FIG. 4E shows an ordinary cell transfer state after the state of FIG. 4D, in which the cell circuit section 108 sends the cell threshold signal to the system control section 105 if the amount of stored cells reaches the threshold cell storage capacity and the system control section 105 which received the cell threshold signal suspends the cell reading from the operating system cell storage section 104. Consequently, 2×N cells are accumulated in the operating system cell storage section 104. In short, the number of cells accumulated in the operating system cell storage section 104 increases by N on each system switching (more precisely, each time when the cell storage section 104 becomes the operating system cell storage section 104). If we assume the capacity of the buffer 111 of the cell storage section 104 is C (cells), overflow and cell loss occurs at the buffer 111 of the cell storage section 104 when:

$$N \times S > C$$

(S: the number of system switching).

SUMMARY OF THE INVENTION

It is therefore the primary object of the present invention to provide a system switching control device and a system switching control method for a device including cell storage sections to be alternately employed as an operating system cell storage section and a standby system cell storage section by means of system switching operation and a cell circuit section for packing the cells which have been temporarily stored in the cell storage sections in appropriate frames and transmitting the frames, by which loss of cells due to the system switching operation can be eliminated.

In accordance with a first aspect of the present invention, there is provided a system switching control device comprising a first system cell storage section, a second system cell storage section, a switching section, a timer section, a system control section, a circuit cell storage section and a cell circuit section. The first system cell storage section and the second system cell storage section temporarily store cells supplied thereto, respectively. The switching section executes system switching operation for changing its connection between the first system cell storage section and the second system cell storage section so that cells inputted to the switching section will be selectively supplied to one of the cell storage sections and thereby the cell storage section that is supplied with the cells will be designated as an operating system cell storage section and the other cell storage section that is not supplied with the cells will be designated as a standby system cell storage section. The timer section counts a time concerning a system switching time U(s) after the system switching operation which is executed by the switching section. The system control section, which is connected to the first system cell storage section, the second system cell storage section and the timer section, reads out cells from the standby system cell storage section during the system switching time U(s) just after the system switching operation executed by the switching section, and reads out cells from the operating system cell storage section during a period after the system switching time U(s). The circuit cell storage section temporarily stores the cells read out by the system control section from the standby system cell storage section and the operating system cell storage section. The cell circuit section packs the cells supplied from the circuit cell storage section in appropriate frames and transmits the frames. The circuit cell storage section is designed to have an enough storage capacity by which all the cells which accumulated in the operating system cell storage section during the system switching time U(s) can be moved into the circuit cell storage section during the period after the system switching time U(s).

In accordance with a second aspect of the present invention, in the first aspect, the circuit cell storage section has a storage capacity that is larger than that of each of the first system cell storage section and the second system cell storage section.

In accordance with a third aspect of the present invention, in the first aspect, after the system switching operation executed by the switching section, the system control section confirms that no cell remains in the standby system cell storage section and thereafter the timer section counts a system switching protection time T(s). A period from the system switching operation executed by the switching section to the end of the system switching protection time T(s) counted by the timer section is regarded by the system control section as the system switching time U(s).

In accordance with a fourth aspect of the present invention, in the first aspect, the circuit cell storage section stores received cells in order of reception and outputs the stored cells in order of the storage.

In accordance with a fifth aspect of the present invention, in the first aspect, the circuit cell storage section includes a circuit cell reception section, a circuit buffer, a circuit cell output section and a circuit cell write/read section. The circuit cell reception section receives cells which are supplied from the first system cell storage section and the second system cell storage section. The circuit buffer, having the enough storage capacity, temporarily stores the cells received by the circuit cell reception section. The circuit cell output section outputs the cells read out from the circuit buffer to the cell circuit section. The circuit cell write/read section executes cell write control for writing the cells received by the circuit cell reception section into the circuit buffer and cell read control for reading out the cells from the circuit buffer.

In accordance with a sixth aspect of the present invention, in the cell write control in the fifth aspect, the circuit cell write/read section writes the cells received by the circuit cell reception into the circuit buffer in order of reception. In the cell read control, the circuit cell write/read section reads out the cells from the circuit buffer in order of the writing.

In accordance with a seventh aspect of the present invention, in the cell read control in the sixth aspect, the circuit cell write/read section suspends the cell reading from the circuit buffer when a signal for preventing cell loss at the cell circuit section is supplied from the cell circuit section.

In accordance with an eighth aspect of the present invention, in the first aspect, the cell circuit section includes a circuit cell reception section, a circuit section, a circuit buffer and a circuit cell write/read section. The circuit cell reception section receives cells which are supplied from the circuit cell storage section. The circuit section packs the received cells in appropriate frames and transmits the frames. The circuit buffer, which is provided between the circuit cell reception section and the circuit section, temporarily stores the cells received by the circuit cell reception section and thereby absorbs delay of cells due to the cell packing operation executed by the circuit section. The circuit cell write/read section executes cell write control for writing the cells received by the circuit cell reception section into the circuit buffer and cell read control for reading out the cells from the circuit buffer.

In accordance with a ninth aspect of the present invention, there is provided a system switching control method for a system switching control device which is provided with: a first system cell storage section for temporarily storing cells supplied thereto; a second system cell storage section for temporarily storing cells supplied thereto; a switching section for executing system switching operation for changing its connection between the first system cell storage section and the second system cell storage section so that cells inputted thereto will be selectively supplied to one of the cell storage sections and thereby the cell storage section that is supplied with the cells will be designated as an operating system cell storage section and the other cell storage section that is not supplied with the cells will be designated as a standby system cell storage section; a timer section for counting a time concerning a system switching time U(s) after the system switching operation which is executed by the switching section; a system control section which is connected to the first system cell storage section, the second system cell storage section and the timer section, which reads out cells from the standby system cell storage section during the system switching time U(s) just after the system switching operation executed by the switching section, and reads out cells from the operating system cell storage section during a period after the system switching time U(s); a circuit cell storage section for temporarily storing the cells read out by the system control section from the standby system cell storage section and the operating system cell storage section; and a cell circuit section for packing the cells supplied from the circuit cell storage section in appropriate frames and transmitting the frames. The system switching control method includes a cell clearance step. In the cell clearance step, all the cells which accumulated in the operating system cell storage section during the system switching time U(s) are cleared from the operating system cell storage section and moved into the circuit cell storage section during the period after the system switching time U(s).

In accordance with a tenth aspect of the present invention, in the ninth aspect, the circuit cell storage section is designed to have a storage capacity that is larger than that of each of the first system cell storage section and the second system cell storage section.

In accordance with an eleventh aspect of the present invention, in the ninth aspect, after the system switching operation executed by the switching section, the system control section confirms that no cell remains in the standby system cell storage section and thereafter the timer section counts a system switching protection time T(s). A period from the system switching operation executed by the switching section to the end of the system switching protection time T(s) counted by the timer section is regarded by the system control section as the system switching time U(s).

In accordance with a twelfth aspect of the present invention, in the ninth aspect, the cells are stored in the circuit cell storage section in order of reception and the stored cells are outputted from the circuit cell storage section in order of the storage.

In accordance with a thirteenth aspect of the present invention, in the twelfth aspect, the cell output from the circuit cell storage section is suspended when a signal for preventing cell loss at the cell circuit section is supplied from the cell circuit section.

In accordance with a fourteenth aspect of the present invention, in the ninth aspect, the cells supplied from the circuit cell storage section to the cell circuit section are temporarily stored in a circuit buffer before being packed in the frames so that delay of the cells due to the cell-packing operation will be absorbed.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
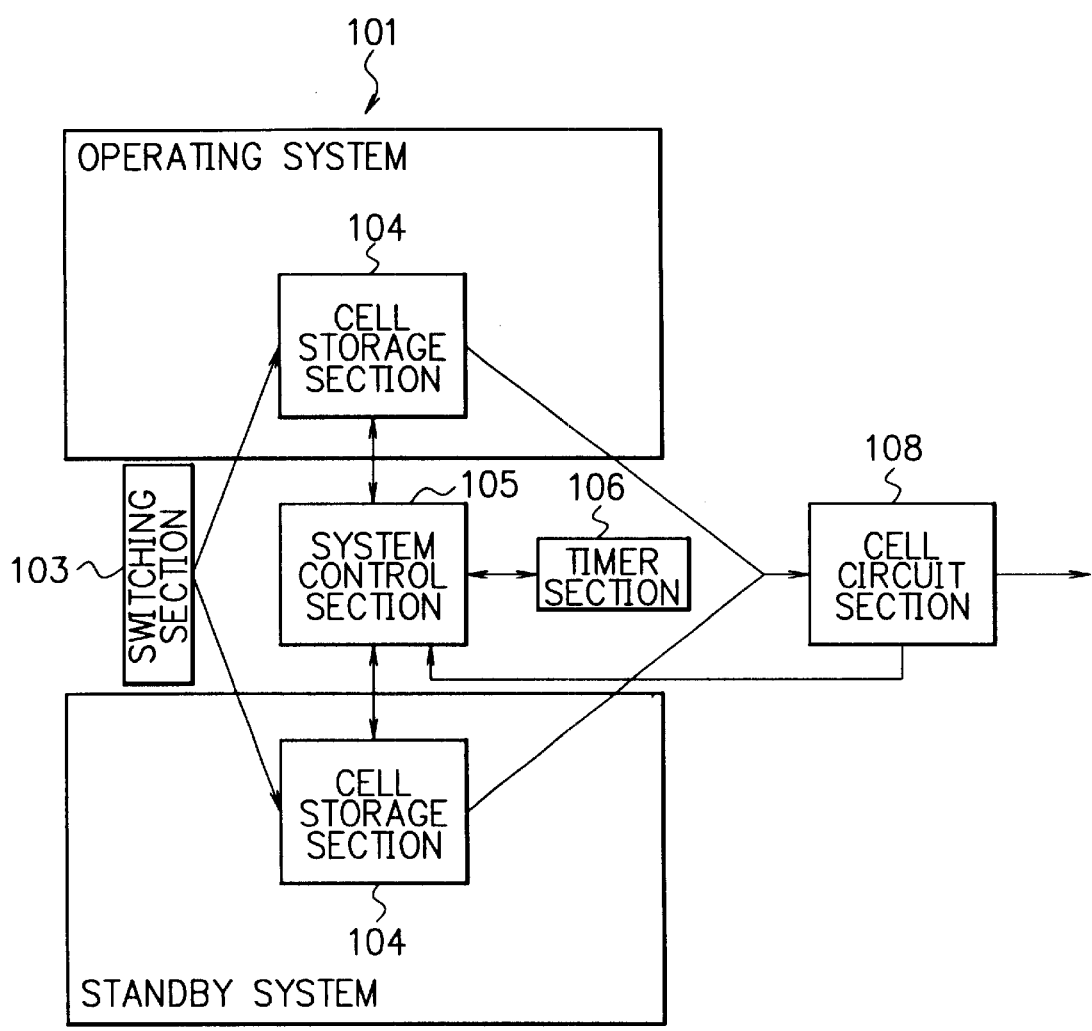
FIG. 1 is a schematic block diagram showing an example of a conventional system switching control device.
Figure 2:
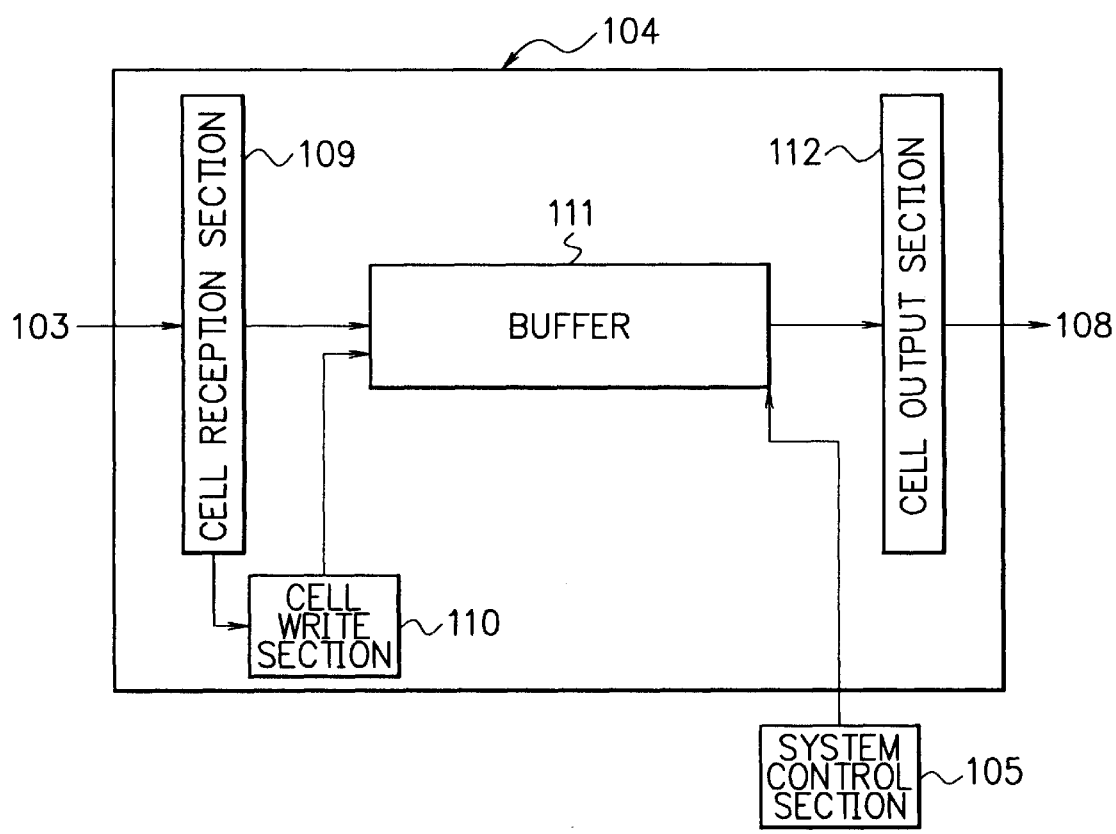
FIG. 2 is a schematic block diagram showing an example of the composition of a cell storage section of the conventional system switching control device of FIG. 1.
Figure 3:
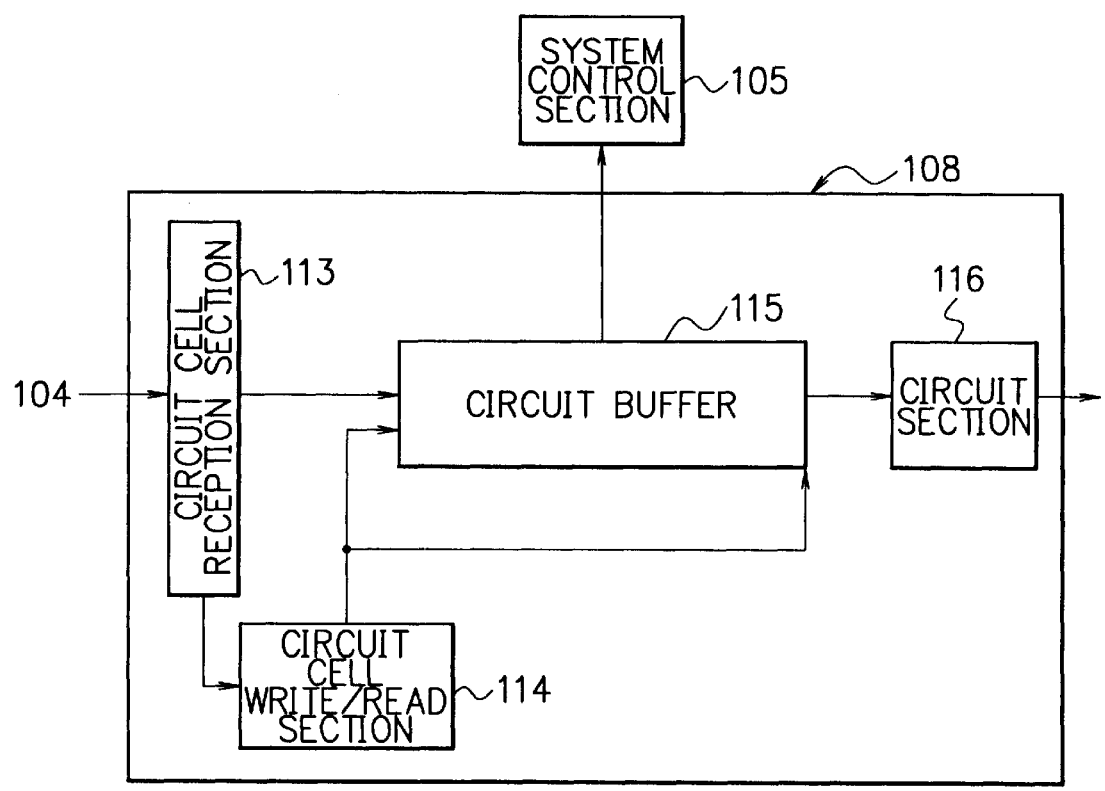
FIG. 3 is a schematic block diagram showing an example of the composition of a cell circuit section of the conventional system switching control device of FIG. 1.
Figure 4A:
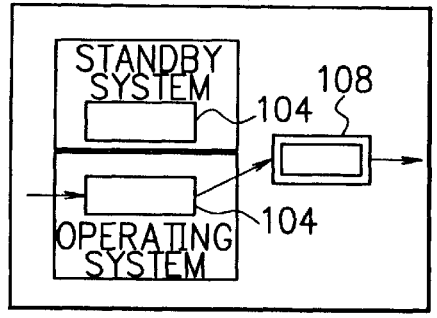
FIGS. 4A through 4E are schematic diagrams showing the change of states of the conventional system switching control device of FIG. 1 when system switching is repeated.
Figure 4E:
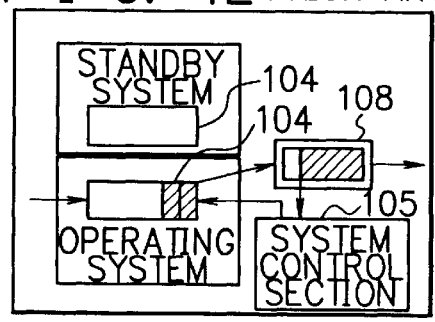
Figure 4B:
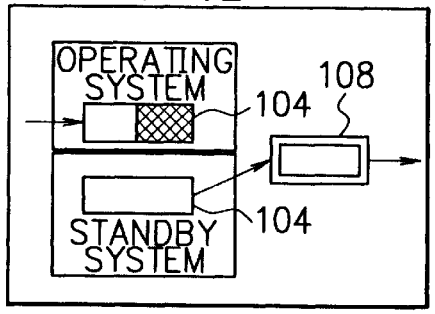
Figure 4C:
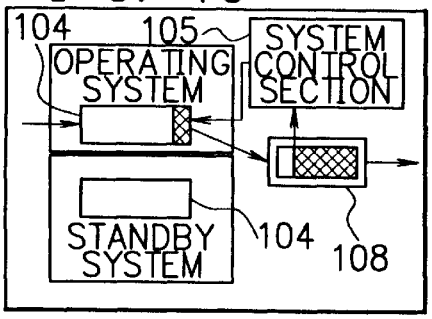
Figure 4D:
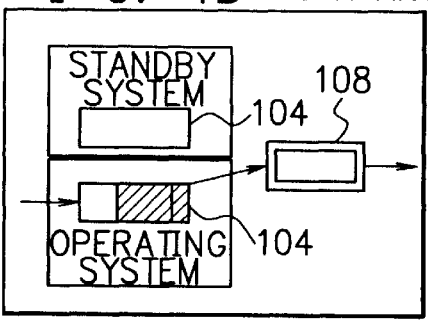

Referring now to the drawings, a description will be given in detail of preferred embodiments in accordance with the present invention.

Figure 5:
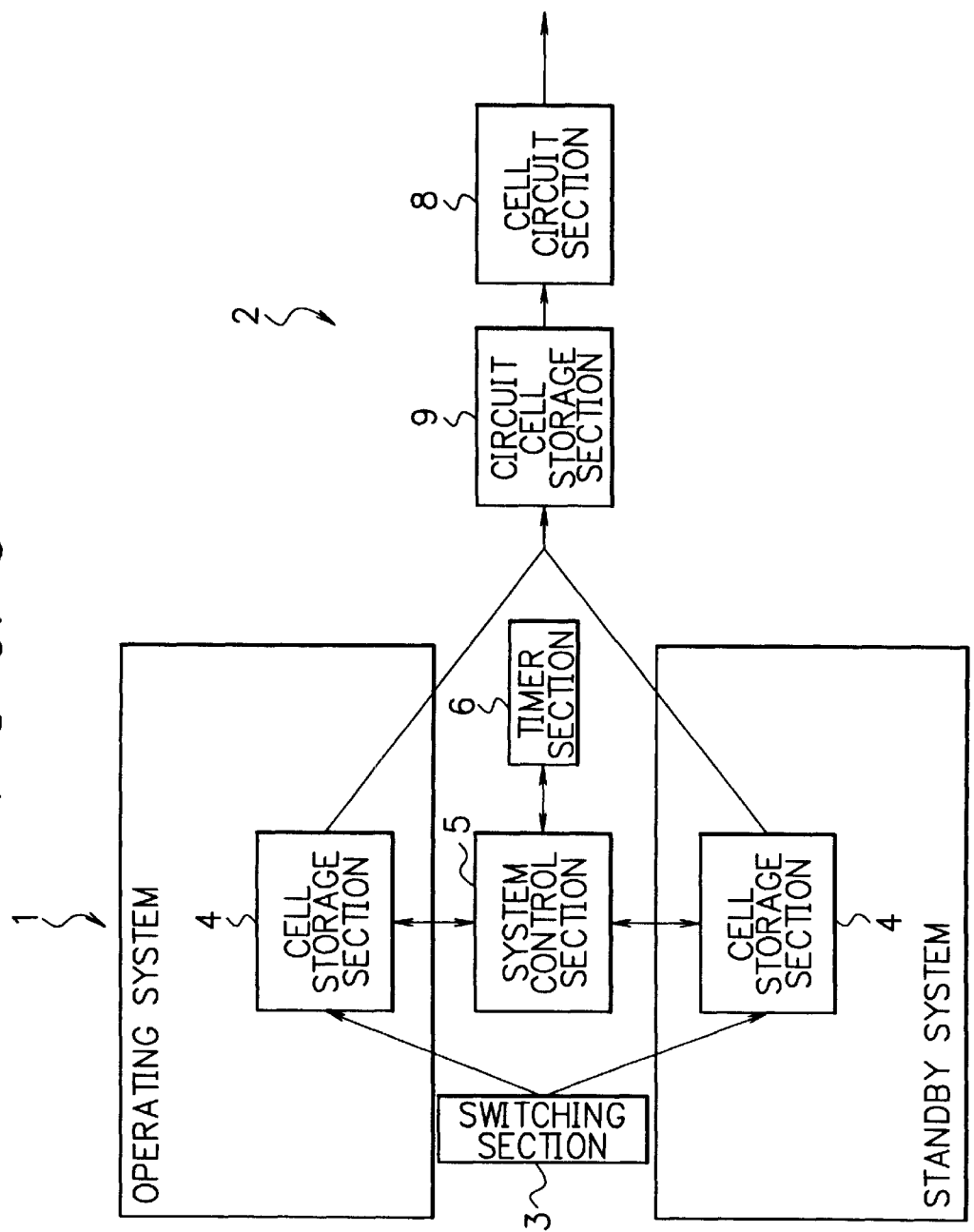
FIG. 5 is a schematic block diagram showing a system switching control device in accordance with an embodiment of the present invention.

FIG. 5 is a schematic block diagram showing a system switching control device in accordance with an embodiment of the present invention. The system switching control device of FIG. 5 is composed of a switch section 1 and a storage/circuit section 2 which is connected to the switch section 1. The switch section 1 includes a switching section 3, two cell storage sections 4, a system control section 5 and a timer section 6. The storage/circuit section 2 includes a cell circuit section 8 and a circuit cell storage section 9.

The two cell storage sections 4 are connected to the switching section 3. The system control section 5 is connected to the two cell storage sections 4. The timer section 6 is connected to the system control section 5. The circuit cell storage section 9 is connected to the two cell storage sections 4. The cell circuit section 8 is connected to the circuit cell storage section 9.

The switching section 3 selectively supplies inputted cells to one of the cell storage sections 4. The cell storage section 4 that receives the cells from the switching section 3 is regarded as an operating system cell storage section 4, and the other cell storage section 4 that does not receive the cells from the switching section 3 is regarded as a standby system cell storage section 4. In short, the switching section 3 executes system switching operation between two systems (operating system and standby system). The cell storage section 4 temporarily stores the cells supplied from the switching section 3 in its buffer. The buffer operates as a FIFO (First-In First-Out) memory having enough capacity, in which the received cells are stored in order of reception and the stored cells are read out in order of the storage. The system control section 5 executes cell read control to the operating/standby system cell storage sections 4 when the system switching operation is conducted.

The circuit cell storage section 9 temporarily stores cells which are supplied from the cell storage sections 4 and supplies the cells to the cell circuit section 8. The operation of the circuit cell storage section 9 will be described later. The cell circuit section 8 packs the cells supplied from the circuit cell storage section 9 in appropriate frames and transmits the frames. The timer section 6 is a timer to which a system switching protection time T(s) is set. In the system switching operation, the timer section 6 starts counting when a count start instruction is supplied from the system control section 5. When the count reached the system switching protection time T(s), the timer section 6 informs the system control section 5 of the elapse of the system switching protection time T(s) and resets the count to "0".

Figure 6:
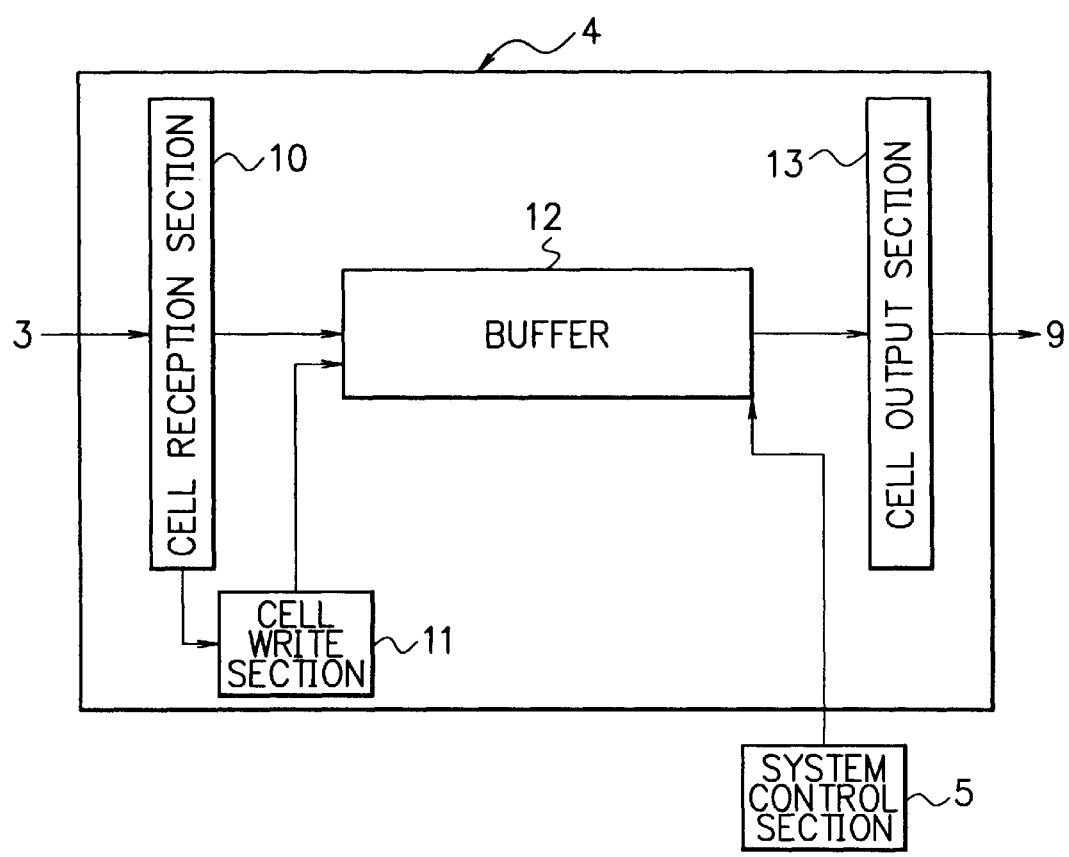
FIG. 6 is a schematic block diagram showing an example of the composition of a cell storage section of the system switching control device of FIG. 5.

FIG. 6 is a schematic block diagram showing an example of the composition of the cell storage section 4 of the system switching control device of FIG. 5. The cell storage section 4 shown in FIG. 6 includes a cell reception section 10, a cell write section 11, a buffer 12 and a cell output section 13. The cell reception section 10 is connected to the switching section 3. The cell write section 11 is connected to the cell reception section 10 and the buffer 12. The buffer 12 is connected after the cell reception section 10. The cell output section 13 is connected between the buffer 12 and the circuit cell storage section 9.

When the cell reception section 10 received a cell from the switching section 3, the cell reception section 10 sends a first cell reception signal (indicating that a cell to be written in the buffer 12 has been reached) to the cell write section 11. The cell write section 11 which received the first cell reception signal from the cell reception section 10 executes cell write control to the buffer 12. The buffer 12 is a FIFO memory which stores cells in order of reception and outputs the cells in order of the storage. The system control section 5 executes cell read control to the buffer 12. The cell output section 13 receives the cells read out from the buffer 12 and sends the cells to the circuit cell storage section 9 in order of reception.

Figure 7:
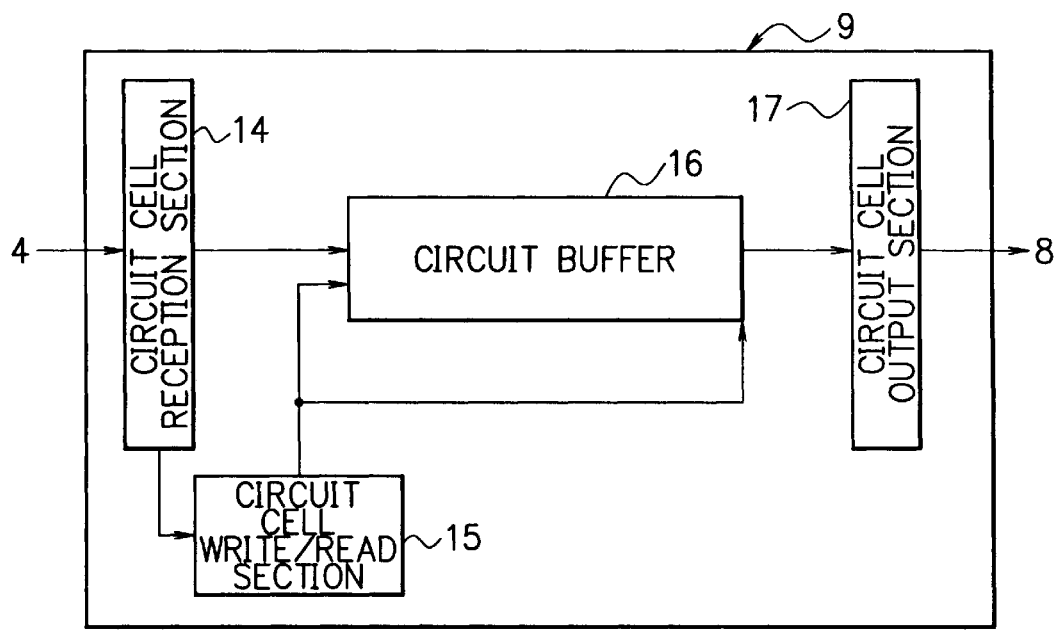
FIG. 7 is a schematic block diagram showing an example of the composition of a circuit cell storage section of the system switching control device of FIG. 5.

FIG. 7 is a schematic block diagram showing an example of the composition of the circuit cell storage section 9 of the system switching control device of FIG. 5. The circuit cell storage section 9 shown in FIG. 7 includes a circuit cell reception section 14, a circuit cell write/read section 15, a circuit buffer 16 and a circuit cell output section 17. The circuit cell reception section 14 is connected to the cell output section 13 of the cell storage sections 4. The circuit cell write/read section 15 is connected to the circuit cell reception section 14 and the circuit buffer 16. The circuit buffer 16 is connected after the circuit cell reception section 14. The circuit cell output section 17 is connected between the circuit buffer 16 and the cell circuit section 8.

When the circuit cell reception section 14 received a cell from the cell output section 13 of the cell storage section 4, the circuit cell reception section 14 sends a second cell reception signal (indicating that a cell to be written in the circuit buffer 16 has been reached) to the circuit cell write/ read section 15. The circuit cell write/read section 15 which received the second cell reception signal from the circuit cell reception section 14 executes cell write control of the circuit buffer 16, in which the received cells are written in the circuit buffer 16 in order of reception. The circuit cell write/read section 15 also executes cell read control of the circuit buffer 16, in which the cells stored in the circuit buffer 16 are read out in order of the writing. The circuit cell write/read section 15 suspends the cell reading from the circuit buffer 16 when a cell threshold signal is supplied from the cell circuit section 8. The details of the cell threshold signal will be described later. The circuit buffer 16 is a FIFO memory having an enough storage capacity for avoiding the cell overflow and the cell loss therein. Preferably, the circuit buffer has a storage capacity that is larger than that of the buffer 12 of the cell storage section 4. The circuit cell output section 17 receives the cells read out from the circuit buffer 16 and sends the cells to the cell circuit section 8 in order of reception.

Figure 8:
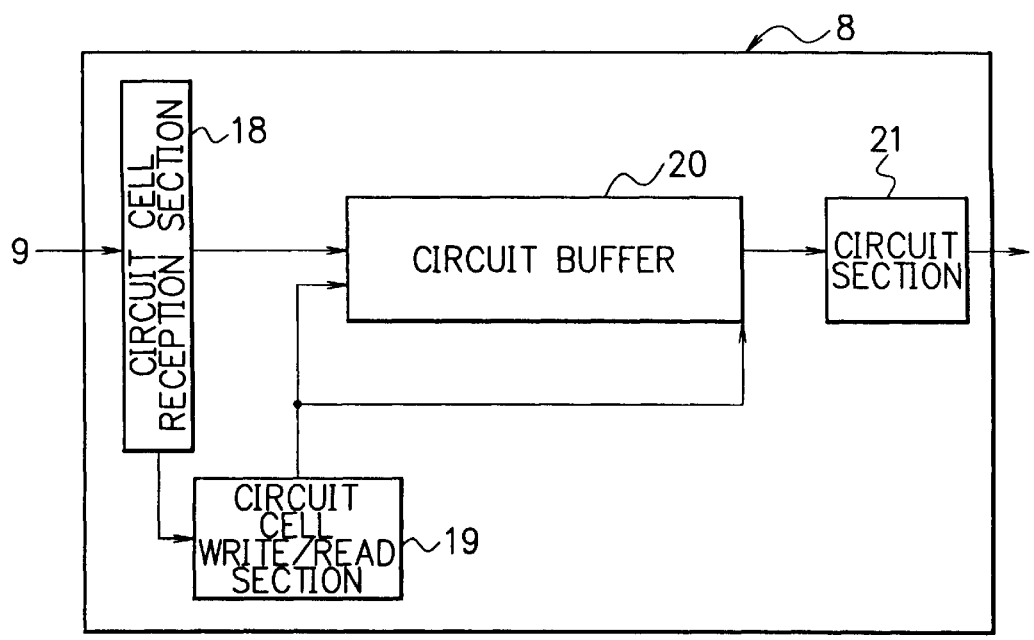
FIG. 8 is a schematic block diagram showing an example of the composition of a cell circuit section of the system switching control device of FIG. 5.

FIG. 8 is a schematic block diagram showing an example of the composition of the cell circuit section 8 of the system switching control device of FIG. 5. The cell circuit section 8 shown in FIG. 8 includes a circuit cell reception section 18, a circuit cell write/read section 19, a circuit buffer 20 and a circuit section 21. The circuit cell reception section 18 is connected to the circuit cell output section 17 of the circuit cell storage section 9. The circuit cell write/read section 19 is connected to the circuit cell reception section 18 and the circuit buffer 20. The circuit buffer 20 is connected after the circuit cell reception section 18. The circuit section 21 is connected after the circuit buffer 20.

When the circuit cell reception section 18 received a cell from the circuit cell output section 17 of the circuit cell storage section 9, the circuit cell reception section 18 sends a third cell reception signal (indicating that a cell to be written in the circuit buffer 20 has been reached) to the circuit cell write/read section 19. The circuit buffer 20 is a small-size FIFO (First-In First-Out) memory which is provided to the cell circuit section 8 in order to absorb delay of cells due to cell-packing operation by the circuit section 21. The circuit cell write/read section 19 which received the third cell reception signal from the circuit cell reception section 18 executes cell write control of the circuit buffer 20, in which the received cells are written in the circuit buffer 20 in order of reception. The circuit cell write/read section 19 also executes cell read control of the circuit buffer 20, in which the cells stored in the circuit buffer 20 are read out in order of the writing. The circuit buffer 20 has a threshold cell storage capacity. When the amount of the cells stored in the circuit buffer 20 reached the threshold cell storage capacity, the cell circuit section 8 outputs a cell threshold signal to the circuit cell write/read section 15 of the circuit cell storage section 9. The circuit cell write/read section 15 which received the cell threshold signal suspends the cell reading from the circuit buffer 16 of the circuit cell storage section 9, thereby loss of cells at the circuit buffer 20 is avoided. The circuit section 21 receives the cells read out from the circuit buffer 20, packs the cells in appropriate frames, and transmits the frames.

In the following, the operation of the system switching control device of FIGS. 5 through 8 will be described more in detail. The inputted cells flow through the switching section 3, the operating system cell storage section 4, the circuit cell storage section 9 and the cell circuit section 8. In the ordinary cell transfer state, the system switching operation for switching between the operating system and the standby system is executed. In the system switching operation, the switching section 3 stops the supply of cells to the present standby system cell storage section 4 (former operating system cell storage section 4) and starts the supply of cells to the present operating system cell storage section 4 (former standby system cell storage section 4).

When the system switching occurred, the system control section 5 suspends the cell reading from the present operating system cell storage section 4 for a system switching time U(s). Therefore, in the present operating system cell storage section 4, cell writing to the buffer 12 is executed ordinarily but cell reading from the buffer 12 is suspended during the system switching time U(s).

In the system switching operation, the system control section 5 operates as follows. The system control section 5 confirms that no cell remains in the former operating system cell storage section 4 (present standby system cell storage section 4). If one or more cells remained in the former operating system cell storage section 4, the system control section 5 continues monitoring the former operating system cell storage section 4 until it confirms that all the cells have been outputted and no cell remains. If we assume it takes a confirmation time S(s) for the confirmation of the vacancy of the former operating system cell storage section 4 since the start of the system switching, the cell reading from the present operating system cell storage section 4 keeps on being suspended during the confirmation time S(s). After the vacancy of the former operating system cell storage section 4 could be confirmed, the system control section 5 further suspends the cell reading from the present operating system cell storage section 4 for the system switching protection time T(s) which is set to the timer section 6. The system switching protection time T(s) guarantees the "no passing" for a cell that has been supplied from the switching section 3 to the former operating system simultaneously with the system switching and which has not reached the former operating system cell storage section 4. The system control section 5 does not make the judgment of the vacancy (no remaining cells) of the whole former operating system only by the vacancy of the former operating system cell storage section 4, but further waits for the system switching protection time T(s), thereby cells existing in the former operating system other than the former operating system cell storage section 4 are prevented from being lost.

The system switching protection time T(s) is set long enough so that any cell remaining in the former operating system can pass the former operating system. After the system switching protection time T(s) (after the confirmation time S(s) after the system switching) has elapsed, the system control section 5 starts the cell reading from the present operating system cell storage section 4. If cells remaining in the former operating system existed at this stage, the cells are lost. The system switching time U(s) can be expressed as:

$$U(s)=S(s)+T(s).$$

Consequently, cells which are written in the present operating system cell storage section 4 during the system switching time U(s) are accumulated in the present operating system cell storage section 4.

FIGS. 9A through 9F are schematic diagrams showing the change of states of the system switching control device of FIG. 5 when the system switching is repeated.

Figure 9A:
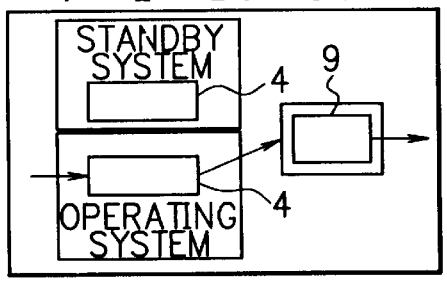
FIGS. 9A through 9F are schematic diagrams showing the change of states of the system switching control device of FIG. 5 when the system switching is repeated.

FIG. 9A shows an ordinary cell transfer state before a system switching is executed, in which cells flow through the operating system cell storage section 4 and the circuit cell storage section 9.

Figure 9E:
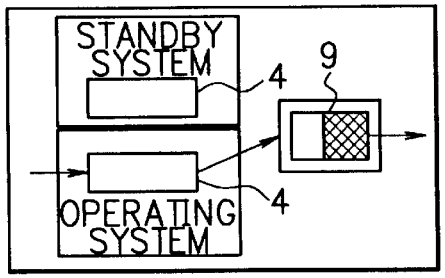
Figure 9B:
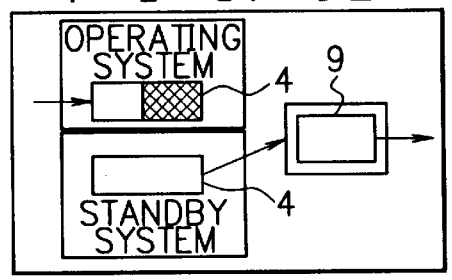

FIG. 9B shows a state just after a system switching, in which the system control section 5 suspends the cell reading from the present operating system cell storage section 4 during the system switching time U(s) while executing cell reading from the present standby system cell storage section 4. Consequently, cells keeps on being supplied to the operating system cell storage section 4 and accumulates in the buffer 12 of the operating system cell storage section 4 during the system switching time U(s). The number of cells which accumulates in the buffer 12 of the operating system cell storage section 4 during the system switching time U(s) will hereafter be assumed to be M (cells).

Figure 9F:
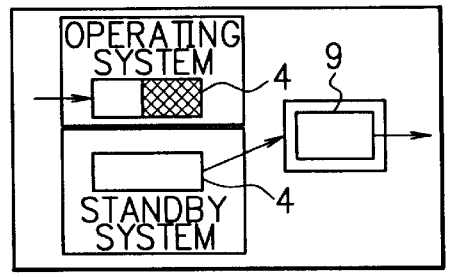
Figure 9C:
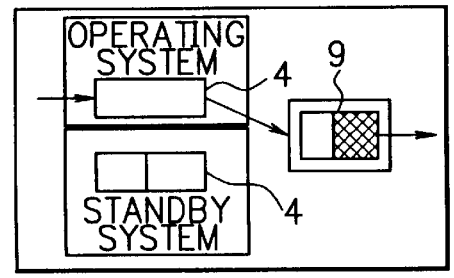

FIG. 9C shows an ordinary cell transfer state in which the system switching of FIG. 9B has been completed. In FIG. 9C, all the cells which have been accumulated in the operating system cell storage section 4 moves to the circuit cell storage section 9, since the cell input speed to the circuit section 21 of the cell circuit section 8 is slower than the cell read speed from the cell storage section 4. The circuit section 21 takes long time for dividing the cells into information cells and control cells and packing the cells in frames, therefore, the cell input speed to the circuit section 21 becomes slow and the cells are accumulated in the circuit cell storage section 9. The circuit cell storage section 9 can accommodate all the cells from the cell storage section 4 since the storage capacity of the circuit buffer 16 of the circuit cell storage section 9 is large enough.

Figure 9D:
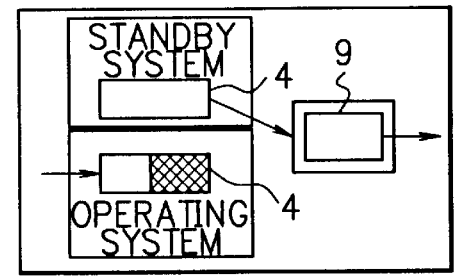

FIG. 9D shows a state just after a second system switching. The number of cells accumulated in the present operating system cell storage section 4 during the system switching time U(s) is M (cells). All the M cells which had been moved and accumulated in the circuit cell storage section 9 in FIG. 9C have been cleared from the circuit cell storage section 9 (moved into the cell circuit section 8) at this stage.

FIG. 9E shows an ordinary cell transfer state in which the second system switching of FIG. 9D has been completed, in which all the cells which have been accumulated in the operating system cell storage section 4 moves to the circuit cell storage section 9, similarly to the case of FIG. 9C.

FIG. 9F shows a state just after a third system switching, in which M cells are accumulated in the present operating system cell storage section 4 during the system switching time U(s), similarly to the case of FIG. 9D. All the M cells which had been moved and accumulated in the circuit cell storage section 9 in FIG. 9E have been cleared from the circuit cell storage section 9 (moved into the cell circuit section 8) at this stage.

Consequently, the cell accumulation in the operating system cell storage section 4 on each system switching is avoided, and thereby the cell loss at the cell storage sections 4 is eliminated.

Incidentally, while the system switching control device of the embodiment has been assumed to have two cell storage sections 4, the present invention can also be applied to a system switching control device having three or more cell storage sections 4.

As set forth hereinabove, in the system switching control device and the system switching control method in accordance with the present invention, all the cells accumulated in the operating system cell storage section 4 during the system switching time U(s) can be moved into the circuit cell storage section 9 after the system switching time U(s), therefore, the cell loss in the system switching operation can be eliminated.

Further, all the cells accumulated in the operating system cell storage section 4 during the system switching time U(s) can be moved into the circuit cell storage section 9 having a large storage capacity, therefore, each cell storage section 4 is not required to have a buffer of an extremely large storage capacity in order to avoid the cell loss.

Incidentally, while the circuit cell storage section 9 having the circuit buffer 16 was added to the cell circuit section 8 having the circuit buffer 20 in the above embodiment, it is also possible to implement the circuit buffers 16 and 20 by one circuit buffer having enough storage capacity which is placed in front of the circuit section 21, as long as all the cells accumulated in the operating system cell storage section 4 during the system switching time U(s) can be moved into the circuit buffer after the system switching time U(s).

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A system switching control device comprising:

a first system cell storage section for temporarily storing cells supplied thereto;

a second system cell storage section for temporarily storing cells supplied thereto;

a switching section for executing system switching operation for changing its connection between the first system cell storage section and the second system cell storage section so that cells inputted thereto will be selectively supplied to one of the cell storage sections and thereby the cell storage section that is supplied with the cells will be designated as an operating system cell storage section and the other cell storage section that is not supplied with the cells will be designated as a standby system cell storage section;

a timer section for counting a time concerning a system switching time U(s) after the system switching operation which is executed by the switching section;

a system control section which is connected to the first system cell storage section, the second system cell storage section and the timer section, which reads out cells from the standby system cell storage section during the system switching time U(s) just after the system switching operation executed by the switching section, and reads out cells from the operating system cell storage section during a period after the system switching time U(s);

a circuit cell storage section for temporarily storing the cells read out by the system control section from the standby system cell storage section and the operating system cell storage section; and a cell circuit section for packing the cells supplied from the circuit cell storage section in appropriate frames and transmitting the frames, wherein:

the circuit cell storage section has an enough storage capacity by which all the cells which accumulated in the operating system cell storage section during the system switching time U(s) can be moved into the circuit cell storage section during the period after the system switching time U(s).

2. A system switching control device as claimed in claim 1, wherein the circuit cell storage section has a storage capacity that is larger than that of each of the first system cell storage section and the second system cell storage section.

3. A system switching control device as claimed in claim 1, wherein:

after the system switching operation executed by the switching section, the system control section confirms that no cell remains in the standby system cell storage section and thereafter the timer section counts a system switching protection time T(s), and a period from the system switching operation executed by the switching section to the end of the system switching protection time T(s) counted by the timer section is regarded by the system control section as the system switching time U(s).

4. A system switching control device as claimed in claim 1, wherein the circuit cell storage section stores received cells in order of reception and outputs the stored cells in order of the storage.

5. A system switching control device as claimed in claim 1, wherein the circuit cell storage section includes:

a circuit cell reception section for receiving cells which are supplied from the first system cell storage section and the second system cell storage section;

a circuit buffer having the enough storage capacity, for temporarily storing the cells received by the circuit cell reception section;

a circuit cell output section for outputting the cells read out from the circuit buffer to the cell circuit section; and a circuit cell write/read section which executes cell write control for writing the cells received by the circuit cell reception section into the circuit buffer and cell read control for reading out the cells from the circuit buffer.

6. A system switching control device as claimed in claim 5, wherein:

in the cell write control, the circuit cell write/read section writes the cells received by the circuit cell reception section into the circuit buffer in order of reception, and in the cell read control, the circuit cell write/read section reads out the cells from the circuit buffer in order of the writing.

7. A system switching control device as claimed in claim 6, wherein in the cell read control, the circuit cell write/read section suspends the cell reading from the circuit buffer when a signal for preventing cell loss at the cell circuit section is supplied from the cell circuit section.

8. A system switching control device as claimed in claim 1, wherein the cell circuit section includes:

a circuit cell reception section for receiving cells which are supplied from the circuit cell storage section;

a circuit section for packing the received cells in appropriate frames and transmitting the frames;

a circuit buffer which is provided between the circuit cell reception section and the circuit section for temporarily storing the cells received by the circuit cell reception section and thereby absorbing delay of cells due to the cell-packing operation executed by the circuit section; and a circuit cell write/read section which executes cell write control for writing the cells received by the circuit cell reception section into the circuit buffer and cell read control for reading out the cells from the circuit buffer.

9. A system switching control method for a system switching control device which is provided with:

a first system cell storage section for temporarily storing cells supplied thereto;

a second system cell storage section for temporarily storing cells supplied thereto;

a switching section for executing system switching operation for changing its connection between the first system cell storage section and the second system cell storage section so that cells inputted thereto will be selectively supplied to one of the cell storage sections and thereby the cell storage section that is supplied with the cells will be designated as an operating system cell storage section and the other cell storage section that is not supplied with the cells will be designated as a standby system cell storage section;

a timer section for counting a time concerning a system switching time U(s) after the system switching operation which is executed by the switching section;

a system control section which is connected to the first system cell storage section, the second system cell storage section and the timer section, which reads out cells from the standby system cell storage section during the system switching time U(s) just after the system switching operation executed by the switching section, and reads out cells from the operating system cell storage section during a period after the system switching time U(s);

a circuit cell storage section for temporarily storing the cells read out by the system control section from the standby system cell storage section and the operating system cell storage section; and a cell circuit section for packing the cells supplied from the circuit cell storage section in appropriate frames and transmitting the frames, wherein:

the system switching control method includes a cell clearance step in which all the cells which accumulated in the operating system cell storage section during the system switching time U(s) are cleared from the operating system cell storage section and moved into the circuit cell storage section during the period after the system switching time U(s).

10. A system switching control method as claimed in claim 9, wherein the circuit cell storage section is designed to have a storage capacity that is larger than that of each of the first system cell storage section and the second system cell storage section.

11. A system switching control method as claimed in claim 9, wherein:

after the system switching operation executed by the switching section, the system control section confirms that no cell remains in the standby system cell storage section and thereafter the timer section counts a system switching protection time T(s), and a period from the system switching operation executed by the switching section to the end of the system switching protection time T(s) counted by the timer section is regarded by the system control section as the system switching time U(s).

12. A system switching control method as claimed in claim 9, wherein the cells are stored in the circuit cell storage section in order of reception and the stored cells are outputted from the circuit cell storage section in order of the storage.

13. A system switching control method as claimed in claim 12, wherein the cell output from the circuit cell storage section is suspended when a signal for preventing cell loss at the cell circuit section is supplied from the cell circuit section.

14. A system switching control method as claimed in claim 9, wherein the cells supplied from the circuit cell storage section to the cell circuit section are temporarily stored in a circuit buffer before being packed in the frames so that delay of the cells due to the cell-packing operation will be absorbed.

* * * * *